No. 674,119. Patented May 14, 1901.
E. F. MAXWELL & E. E. ANGELL.
SOLE EDGE TRIMMER.
(Application filed Sept. 4, 1900.)
(No Model.)
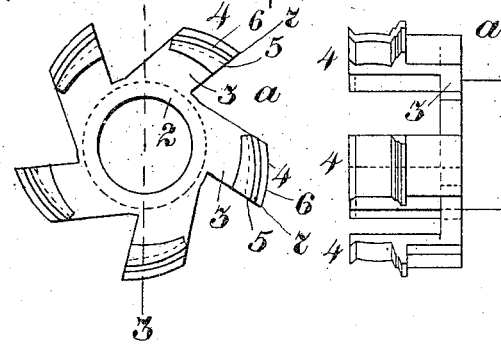
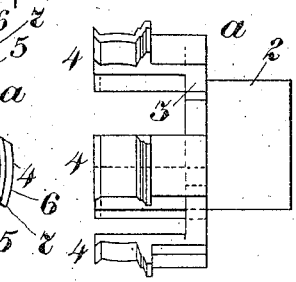
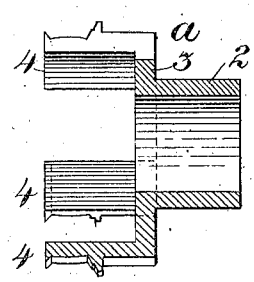
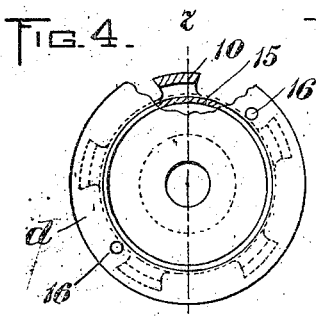
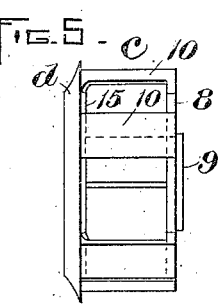
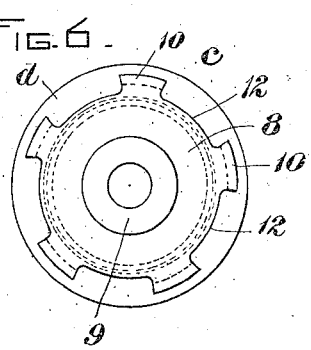
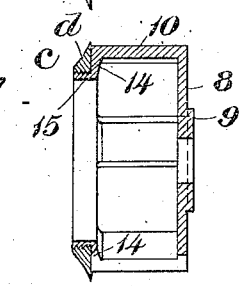
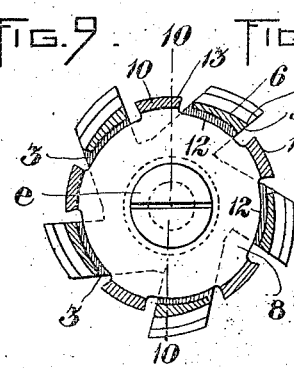
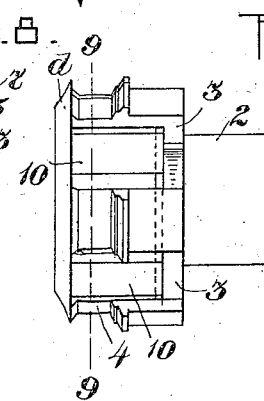
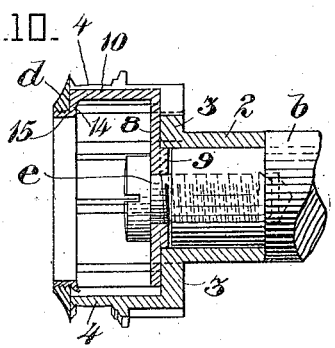
WITNESSES:
John Pezzetti
E. Batchelder
INVENTORS
E. F. Maxwell
E. E. Angell
by Wright Brown Quinby
attys.

UNITED STATES PATENT OFFICE.

EDWIN F. MAXWELL, OF SAN FRANCISCO, CALIFORNIA, AND EDWIN E. ANGELL, OF SOMERVILLE, MASSACHUSETTS.

SOLE-EDGE TRIMMER.

SPECIFICATION forming part of Letters Patent No. 674,119, dated May 14, 1901.

Application filed September 4, 1900. Serial No. 28,879. (No model.)

*To all whom it may concern:*

Be it known that we, EDWIN F. MAXWELL, of San Francisco, in the county of San Francisco and State of California, and EDWIN E. ANGELL, of Somerville, in the county of Middlesex and State of Massachusetts, have invented certain new and useful Improvements in Sole-Edge Trimmers, of which the following is a specification.

This invention relates to machines or tools for trimming the edges of the soles of boots and shoes, and particularly to tools of the type shown in Letters Patent of the United States No. 625,115, in which a tool is shown comprising a series of cutters and edge-guards occupying spaces between the cutters and arranged so that channels are left between the cutters and the guards for the escape of fine cuttings and dust inward toward the center of the trimmer, said guards limiting the depth of cut of the cutters into the edge of the sole.

The present invention has for its object to enable the guards to be rigidly secured in place and easily and conveniently applied and removed.

The invention consists in the improvements which we will now proceed to describe and claim.

Of the accompanying drawings, forming a part of this specification, Figure 1 represents an end elevation of the cutter member. Fig. 2 represents a side elevation of the same. Fig. 3 represents a section on line 3 3 of Fig. 1. Fig. 4 represents an elevation of the outer end of the guard cup or member. Fig. 5 represents a side elevation of the same. Fig. 6 represents an elevation of the inner end of the guard-cup. Fig. 7 represents a section on line 7 7 of Fig. 4. Fig. 8 represents a side elevation of the cutter and guard-cup connected. Fig. 9 represents a section on line 9 9 of Fig. 8. Fig. 10 represents a section on line 10 10, Fig. 9.

The same reference letters and numerals indicate the same parts in all the figures.

In the drawings, $a$ represents the cutter member, which is spider-shaped, and comprises a hub 2, formed to fit upon the driving-spindle $b$, arms 3, radiating tangentially from the hub, and cutters 4, formed on the outer portions of the arms and having their front ends 5 ground at an acute angle, with their outer faces 6 adapted to form cutting edges 7, the said outer faces being backed off, as usual, to give the necessary clearance. The outer faces 6 are molded to give the cutting edge the desired contour.

$c$ represents the guard member, which comprises an end plate 8, which is preferably provided with a circular boss or offset 9, formed to enter the cavity of the hub, as shown in Fig. 10. The guards 10 10 extend from the margin of the end plate 8 and are formed to enter the space between the cutters 4, the margin of the end plate being cut away or reduced between the guards to form recesses 12, Figs. 6 and 9, which receive the cutters 4, as shown in Fig. 9. The outer faces 13, Fig. 9, of the guards are concentric with the axis of the cutter and are slightly lower than the cutting edges 7, so that the said outer faces limit the thickness of the cuttings removed from a sole edge by the cutters. The width of each guard is less than the width of the space between two adjacent cutters, so that there is a sufficient opening between the cutting edge of each cutter and the adjacent guard for the passage of fine cuttings and dust into the interior of the cutter. The outer ends of the guards are connected by short arms or necks 14, Figs. 7 and 10, with an externally-threaded ring 15, which projects from the outer end of the series of guards and supports the annular upper guard or shield $d$, said shield being internally screw-threaded to engage the thread of the ring 15 and provided with orifices 16 to engage a spanner by which it may be turned to screw it onto the ring 15.

It will be seen that the guard member has the general shape of a cup, of which the plate 8 forms the bottom, the guards 10 the margin, and the ring 15 and shield $d$ the mouth. The ring 15 being integral with the guards and forming a connection between their outer ends imparts, with the shield, ample stiffness and rigidity to the guards, each guard being rigidly supported at its inner end by the plate 8 and at its outer end by the ring 15 and shield $d$.

The guard-cup is attached to the cutter and shaft by the screw $e$, which also attaches the cutter to the shaft, as shown in Fig. 10.

For the sake of convenience the portions the cutter member which connect the cutters 4 with the hub 2 may be termed the "arm-carrying" portions of said cutter member, and the end plate 8 of the guard member c may be termed the "arm-carrying" portion of the guard member. The arm-carrying portions of the cutter and guard members sit against each other, as shown in Fig. 10, and are held in such position by the screw c. This structure leaves the entire inner portion of the device open or unobstructed, so that the cuttings removed from the sole edge may readily pass into said opening or space, as hereinbefore described.

It will be seen from the foregoing that the guard-cup can be quickly and easily applied and removed. Hence it is a very simple matter to substitute for one guard-cup another of smaller diameter, as may be required from time to time by the reduction of the height of the cutting edges of the cutters caused by the wear and grinding. In practice a series of guard-cups will be provided, varying in diameter to suit the different working diameters of the cutter, so that when the cutter is new a guard-cup of maximum diameter will be employed, and as the cutter is reduced, successively smaller guard-cups will be employed.

We claim—

1. A guard-cup comprising an end plate having a central orifice to receive an attaching-screw, guard-arms joined at their inner ends to the margin of the end plate, said plate being provided with cutter-receiving recesses between the arms, and an annular shield secured to and supported by the outer ends of the guard-arms.

2. A guard-cup comprising an end plate having a central orifice to receive an attaching-screw, guard-arms joined at their inner ends to the margin of the end plate, said plate being provided with cutter-receiving recesses between the arms, a shield-holding ring joined to the outer ends of the guard-arms, and a shield engaged with said ring.

3. The combination with a spider-shaped cutter, of a cup-shaped guard member having a screw-receiving orifice in its inner end, the arm-carrying portions of the cutter and guard members being adjacent to each other, whereby an open space is provided inside of said members.

4. The combination with a spider-shaped cutter, of a cup-shaped guard member having a screw-receiving orifice in its inner end, the cutter and guard members having their arm-carrying portions adjacent to each other, whereby an open space is provided inside of said members and whereby they are adapted to be attached by a single screw.

In testimony whereof we have affixed our signatures in presence of two witnesses.

EDWIN F. MAXWELL.
EDWIN E. ANGELL.

Witnesses:
C. F. BROWN,
HENRY E. ADAMS.